United States Patent [19]

Tenjimbayashi

[11] Patent Number: 5,467,184
[45] Date of Patent: Nov. 14, 1995

[54] METHOD OF LARGE DEFORMATION MEASUREMENT USING SPECKLE INTERFEROMETRY

[75] Inventor: Koji Tenjimbayashi, Tsukuba, Japan

[73] Assignees: Agency of Industrial Science & Technology; Ministry of International Trade & Industry, both of Tokyo, Japan

[21] Appl. No.: 118,296

[22] Filed: Sep. 9, 1993

[30] Foreign Application Priority Data

Sep. 9, 1992 [JP] Japan .................................. 4-266633

[51] Int. Cl.⁶ .................................................. G01B 9/02
[52] U.S. Cl. .......................................... 356/35.5; 356/345
[58] Field of Search ................................. 356/35.5, 349, 356/353, 345, 354

[56] References Cited

U.S. PATENT DOCUMENTS 4,046,477  9/1977  Kaule ....................................... 356/35.5
5,065,331  11/1991 Vachon et al. ........................... 356/35.5
5,094,528  3/1992  Tyson, II et al. ........................ 356/35.5

*Primary Examiner*—Samuel A. Turner
*Attorney, Agent, or Firm*—Oblon, Spivak, McClelland, Maier & Neustadt

[57] ABSTRACT

A method of deformation measurement using speckle interferometry comprises the steps of forming a series of speckle images at specified time intervals by using an interferometer to superpose a laser beam reflected from the object whose deformation is to be measured and a laser beam not affected by the object, storing the speckle images in a memory as they are formed, using the difference between the speckle image stored before the deformation and a second speckle image stored in the course of the deformation to measure the deformation between the times that the two speckle images were recorded, repeating this process for successive pairs of speckle images up to the one recorded after completion of the deformation, and adding together the individual deformation measurements obtained.

1 Claim, 5 Drawing Sheets

IMAGES $S_0 - S_{11}$

DEFORMATION AMOUNT $S_5 - S_0$

DEFORMATION AMOUNT $S_9 - S_5$

DEFORMATION AMOUNT $S_{11} - S_9$

DEFORMATION AMOUNT $S_{11} - S_0$ 5,467,184

METHOD OF LARGE DEFORMATION MEASUREMENT USING SPECKLE INTERFEROMETRY

BACKGROUND OF THE INVENTION

1. Field of the Invention

This invention relates to a method of deformation measurement using speckle interferometry which enables nondestructive measurement of the deformation of a machine tool, industrial product or other such object using speckle interferometry.

2. Prior Art Statement

Since speckle interferometry can be used for contactless, highly accurate measurement of the vibration and deformation distribution of even rough surfaced objects such as machine components, it is an important measurement technology. Particularly significant one among the different types of speckle interferometry is electronic speckle pattern interferometry (ESPI). With ESPI it is possible to obtain interference fringes by taking a speckle pattern images with a TV camera and processing the video signals with electronic circuits or storing the images in a frame memory and processing them with a computer. Since ESPI is simpler to conduct than conventional real-time holography interferometry using photographic plates, it can be expected to find applications in nondestructive inspection etc. at the point of production.

On the other hand, even though such methods of measurement using interferometry are highly accurate, they have the disadvantage of being limited to a narrow measurement range. Speckle interferometry has a particularly severe limitation in that speckle noise on the interference fringes may, at large deformation or vibration, cause the density of the interference fringes to become so high as to make it impossible to read the interference fringes and thus impossible to carry out the measurement.

This invention was accomplished in light of the foregoing circumstances and has as its object to provide a method of deformation measurement using speckle interferometry which is able to maintain high measurement accuracy and achieve measurement over a wide range, specifically to enable measurement even when the deformation of the object being measured is on the millimeter order.

SUMMARY OF THE INVENTION

For achieving the aforesaid object, this invention provides a method of deformation measurement using speckle interferometry comprising the steps of forming a series of speckle images at specified time intervals by using an interferometer to superpose a laser beam reflected from an object whose deformation is to be measured and a laser beam not passing via the object, storing the series of speckle images in a memory as they are formed, using the difference between an appropriate two of the plurality of speckle images to measure the deformation of the object during the time interval between the formation times of the two speckle images, repeating the preceding step to obtain a plurality of deformation measurements, and summing the plurality of deformation measurements to obtain a measurement of a large deformation not measurable by ordinary speckle interferometry.

A laser beam reflected from the deforming object and a laser beam not passing via (i.e. unaffected by) the object are superposed to obtain a continuous series of speckle images. A stopped down TV camera successively records the speckle images at regular time intervals (64 speckle images at 1/30 intervals, for example). Later, two of the speckle images are retrieved and the difference between them is calculated by a computer. This makes it possible to observe the deformation that occurred in the object between the recording times of the two images as interference fringes. The interference fringe pattern represents the deformation distribution in the form of contour lines and each interference fringe corresponds to a distance equal to half the wavelength of the laser beam used. The foregoing procedure is then repeated and the deformation measurements obtained are added together. As a result, it is possible to measure the distribution of large or rapid deformation not measurable with ordinary speckle interferometry and to do so contactlessly and with high resolution (on the submicron order).

The above and other features of the present invention will become apparent from the following description made with reference to the drawings.

BRIEF DESCRIPTION OF THE DRAWINGS

FIGS. 8(a)–(e) are schematic views of the measurement method of the present invention, wherein FIG. 8(a) shows a series of recorded speckle pattern images, FIG. 8(b) shows an image representing the deformation between time 0 and time 6 obtained by taking the difference between the first and sixth images shown in FIG. 8(a), FIG. 8(c) shows an image representing the deformation between time 6 and time 10 obtained by taking the difference between the sixth and tenth images shown in FIG. 8(a), FIG. 8(d) shows an image representing the deformation between time 10 and time 12 obtained by taking the difference between the tenth and twelfth images shown in FIG. 8(a), and FIG. 8(e) shows the image obtained by summing the deformations shown in FIGS. 8(b) to 8(e).

DESCRIPTION OF THE PREFERRED EMBODIMENT

Figure 1:
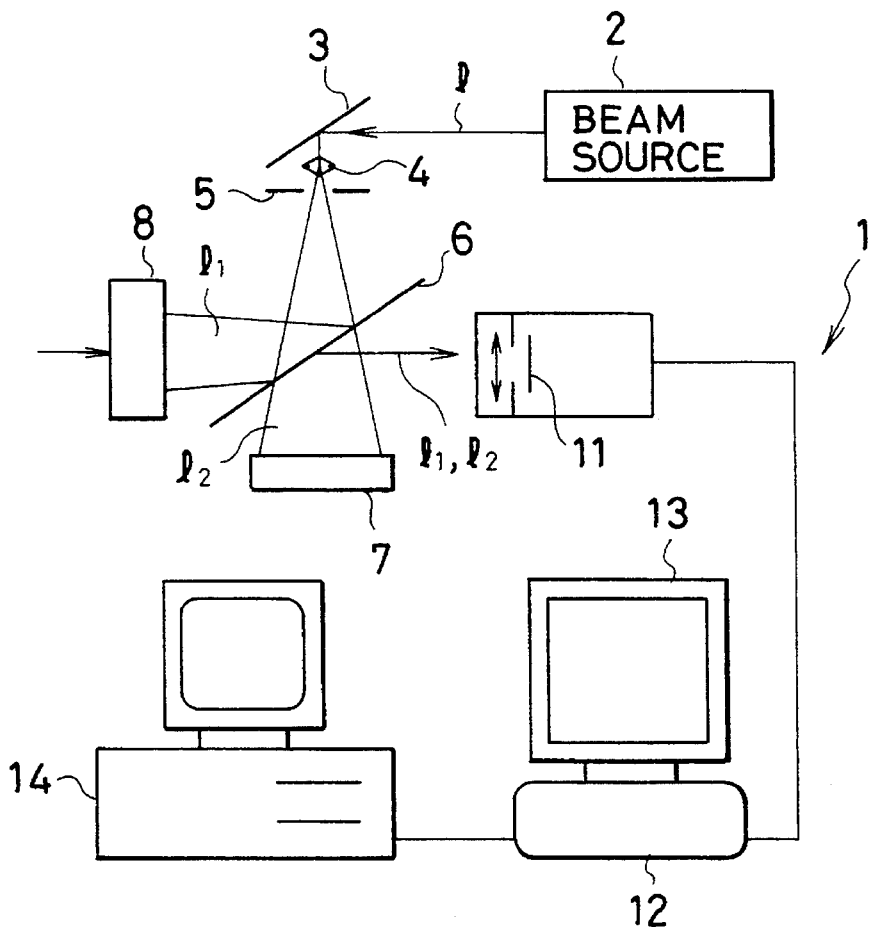
FIG. 1 is a schematic view of a deformation measurement apparatus using electronic speckle pattern interferometry.

An embodiment of the method of deformation measurement using speckle interferometry according to the invention will now be explained with reference to the drawings. FIG. 1 shows the configuration of a deformation measurement apparatus using electronic speckle pattern interferometry, which is used to conduct the deformation measurement method of the present invention. The measurement apparatus, indicated by reference numeral 1, is equipped with a He-Ne laser or other such laser beam source 2, a mirror 3, a microscope object lens 4, a pinhole 5 and a half mirror 6. A reference object is placed on the transmission side of the half mirror 6 and an object to be measured 8 is placed on the reflection side thereof. A TV camera or other such image pickup device 11 is disposed on the opposite side of the half mirror 6 from the object to be measured 8. The image pickup device 11 is connected with a frame memory 12, a monitor 13 and a personal computer 14.

When the deformation measurement apparatus 1 is operated for measuring the deformation of the object 8, the laser beam l emitted by the laser beam source 2 is reflected by the mirror 3 through the microscope object lens 4 and pinhole 5 so as to become a divergent beam which is then amplitude divided by the half mirror 6. One of the divided laser beams (the reflected laser beam $l_1$ in the illustrated example) is directed onto the object to be measured 8 and the light scattered by reflection from the object 8 (the object light) transmits through the half mirror 6 and enters the image pickup device 11. The other divided laser beam (the transmitted laser beam $l_2$ in the illustrated example) is directed onto the reference object 7 and the light scattered by reflection from the reference object 7 (the reference light) is reflected by the half mirror 6 and enters the image pickup device 11 where it is superposed on the object light. As the reference object 7 there can be used a concave mirror. Insofar as the luminous energy is sufficient, the lens aperture of the image pickup device 11 (ordinarily a TV camera) is stopped down so as to increase the speckle size. In this specification, the superposed image produced by the object light and the reference light reaching the pickup element of the image pickup device 11 is referred to as a speckle pattern image.

The explanation of the present invention will be better understood if preceded by an explanation of ordinary speckle interferometry. In ordinary speckle interferometry, before starting the measurement a speckle pattern image of the object 8 before deformation is stored in the frame memory 12. Next a speckle pattern image of the object 8 after deformation is stored in the frame memory 12. Then by taking the difference between the speckle images before and after deformation it is possible to observe a speckle interference fringe pattern. The interference pattern appears as dark and light showing the deformation distribution. When the deformation is large, however, the measurement by this method produces interference fringes of such high density that they may not be possible to read. In conventional real-time holographic interferometry, holograms have to be remade many times in the course of the deformation. Therefore, the measurement is not only discontinuous but highly troublesome to conduct.

In contrast, in the present invention, which uses electronic speckle pattern interferometry, only speckle pattern images of the continuously deforming object to be measured are stored in real time (at the frame rate of the TV camera) one after another in the large capacity frame memory 12. Then, at a later time, the difference is taken between an appropriate two of the speckle images and a calculation is made to determine the deformation of the object during the interval between the times that the two speckle patterns were formed. The same procedure is then repeated for other speckle image pairs and the deformation measurements are summed to obtain a large deformation measurement not possible by ordinary speckle interferometry without loss of continuity.

An example of the present invention will now be described.

An ESPI system was configured in accordance with FIG. 1. As the large capacity frame memory 12 there was used an Image PC1181 produced by EDEC Co. The memory had the capacity to store four pictures each consisting of 256×240 pixels at a density of 8 bits (256 shades). As the personal computer 14 there was used a PC9801VM produced by NEC. The computer had a clock speed of 10 MHz and was equipped with a 40 MB external hard disk. As the image pickup device 11 there was used a Sony XC-57 CCD camera having 510×492 available pixels and equipped with a TV camera zoom lens. The lens aperture was set to F8. The monitor 13 was a 9-inch monochrome display. As the laser beam source 2 there was used an NEC 632.8 nm wavelength He-Ne laser with an output of about 15 mW. The object to be measured 8 was cantilevered beam consisting of a 157 mm (h)×40 mm (w)×2 mm (t) rectangular plate of transparent vinyl chloride painted white and fixed in a vice up to 32 mm from its bottom edge. The measured region of the cantilevered beam was up to 34.5 mm above its bottom edge (the fixed edge). The reference object 7 was a 100 mm (h)×85 mm (w) rectangular plate whose surface was painted white to obtain a light scattering surface.

Deformation was produced by bringing a micrometer head into contact with the rear side of the cantilevered beam a point about 15 mm from its upper edge (free edge) and manually imparting deformation in approximately one graduation (10 μm) increments. First, the cantilevered beam was imparted with an appropriate deformation to bend it forward and the speckle image $S_0$ at this time was stored in the frame memory. The image date was then immediately stored in the hard disk. This was defined as the state before deformation (the undeformed state). The micrometer head was then turned one graduation to bend the cantilevered beam further forward and the speckle image $S_1$ at this time was stored in the frame memory and the image data was immediately stored in the hard disk. The micrometer head was then turned one graduation to bend the cantilevered beam further forward than at $S_1$ and the speckle image $S_2$ at this time was stored in the frame memory and the image data was again immediately stored in the hard disk. In this same way a total of 10 speckle images ($S_0$–$S_9$) were recorded. The computer was then used to calculate the difference between the undeformed state and each of the deformed states ($S_{0,i}=S_i-S_0, i=1, 2, \ldots, 9$).

Figure 2:
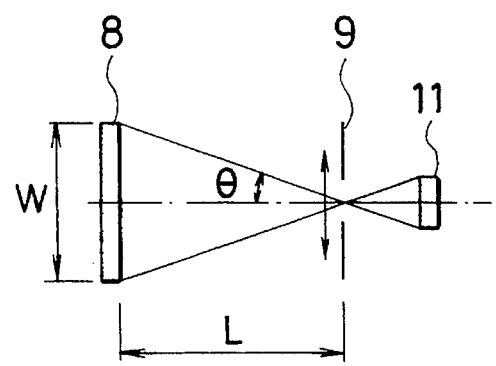
FIG. 2 is an equivalent optical system of the apparatus shown in FIG. 1.

The experiment was conducted using the optical system of FIG. 1. The equivalent interference system obtained by bending this relative to the half mirror is as shown in FIG. 2. The CCD camera and the object to be measured are directly opposed. The focal point of the microscope object lens coincides with the center 0 of the thoroughly stopped down aperture. In FIG. 2, define the width of the object as W and the distance between the object and the diaphragm 9 of the TV camera as L. Then the view angle θ satisfies the relationship tan θ=W/(2L). Assume that a point P located approximately at the center of the object moves distance D (the amount of deformation) along the optical axis. Since θ≈0, the phase φ of the light emitted from point P onto the CCD element Q changes by $$\phi = 2D\ (2\pi/\lambda) \quad (1)$$

where λ is the wavelength of the laser beam. The measurement is conducted by using Eq. 1 to calculate the deformation amount D from the observed interference fringe phase φ. The deformation amount D in Eq. 1 is deemed to be the component in the direction of the view angle θ. In the test under discussion, the value of W was 40 mm (34.5 mm in the height direction) and the value of L was 500 mm. The view angle θ was therefore approximately 0.04. The relative error of the deformation amount D is 1−cos (0.04)=0.8×10⁻³, or less than 0.1%. It must be noted, however, that deformation D involves a three-dimensional spectrum and when a fixed point of zero deformation cannot be identified, it is ordinarily determined by finding the phase change φi from four directions (i=1–4). In the experiment under discussion, the direction of deformation and the fixed edge of the object were known and the object view angle was small. The analysis at any point on the object could therefore be conducted using Eq. 1. Since the purpose of this explanation is to demonstrate that the proposed method is able to measure large deformations, the analysis was not conducted over the entire area. Instead the analysis was limited to manually determining the peak positions of the dark fringes along the center line in the height direction of the object. In this case, the deformation $D_N$ at the Nth dark fringe from the fixed edge can be obtained as $$D_N = (\lambda/2)N\ (N=0, 1, 2\ldots) \quad (2)$$

Figure 3A:
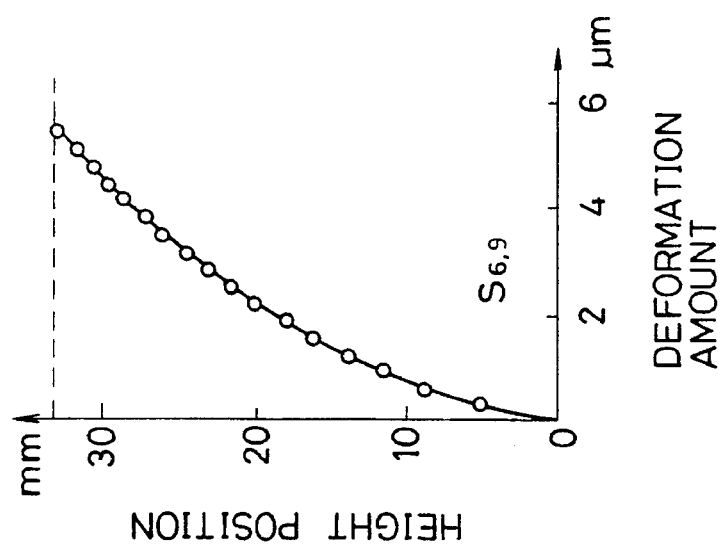
FIG. 3(a) is a graph showing the analytical results for the deformation ($S_{0,3}$) of a beam between time 0 and time 3.
Figure 3B:
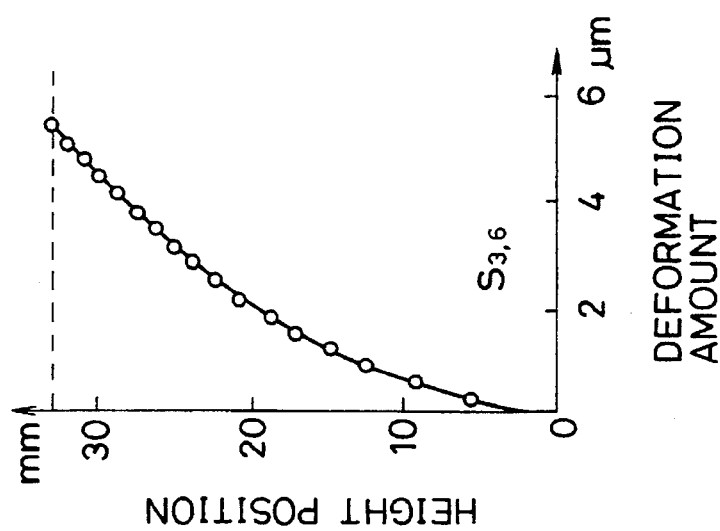
FIG. 3(b) is a graph showing the analytical results for the deformation ($S_{3,6}$) of a beam between time 3 and time 6.
Figure 3C:
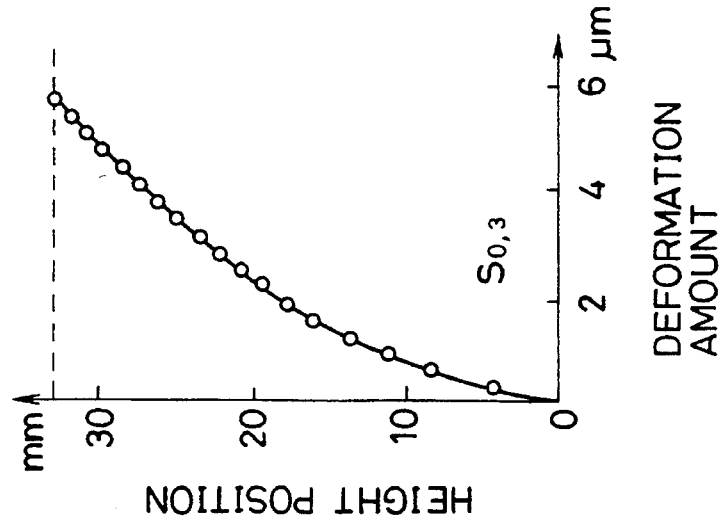
FIG. 3(c) is a graph showing the analytical results for the deformation ($S_{6,9}$) of a beam between time 6 and time 9.
Figure 4:
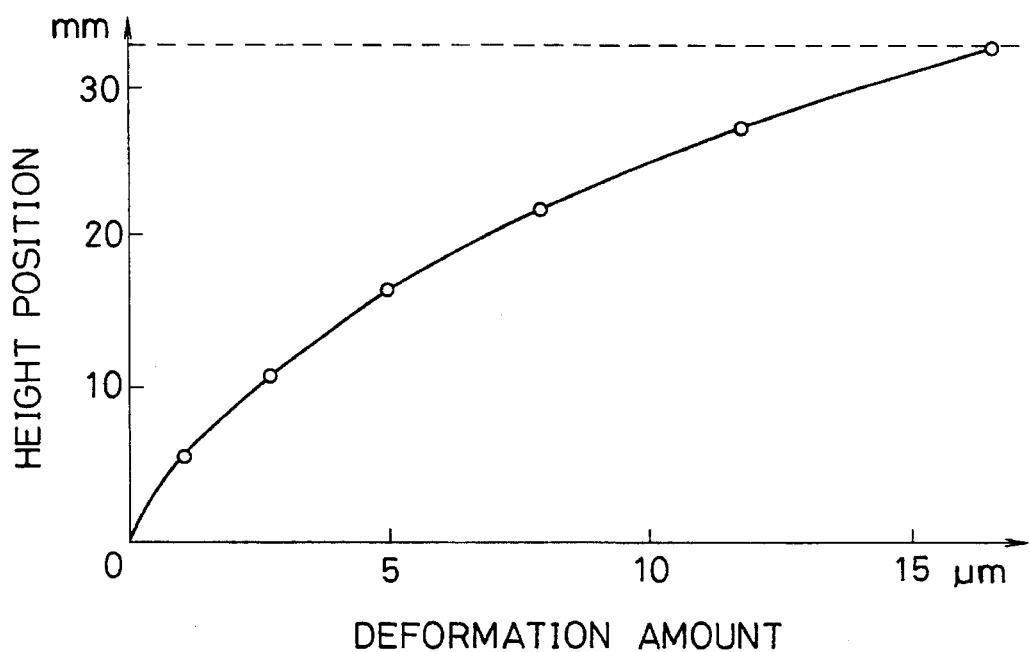
FIG. 4 is a graph showing the distribution of a large deformation $S_{0,9}$ obtained by summing deformation $S_{0,3}$, $S_{3,6}$ and $S_{6,9}$.

FIGS. 3(a), 3(b) and 3(c) show the results of the analysis for deformations $S_{0,3}$, $S_{3,6}$ and $S_{6,9}$. The deformation amounts at the center position 33 mm from the bottom (referred to as the "observation" point) were 5.71 µm, 5.36 µm and 5.38 µm. Combining these gives a deformation amount of 16.45 µm. This is the deformation amount that could not be measured with $S_{0,9}$. FIG. 4 is a graph showing the distribution of the object deformation $S_{0,9}$ obtained by summing deformations $S_{0,3}$, $S_{3,6}$ and $S_{6,9}$.

Figure 5A:
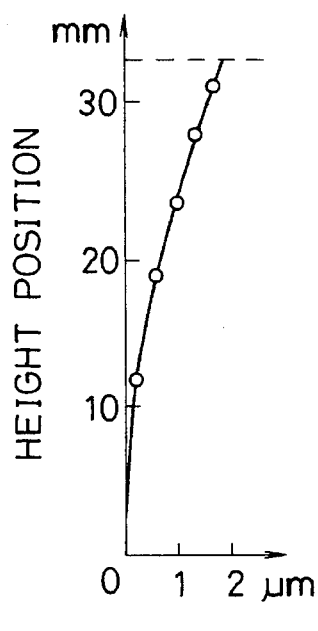
FIG. 5(a) is a graph showing an analysis of deformation between time 0 and time 1.
Figure 5B:
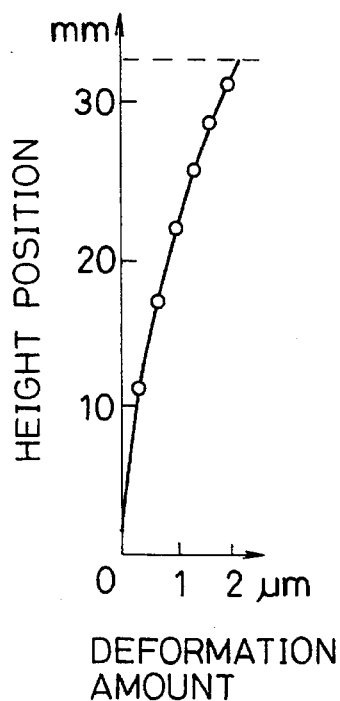
FIG. 5(b) is a graph showing an analysis of deformation between time 1 and time 2.
Figure 5C:
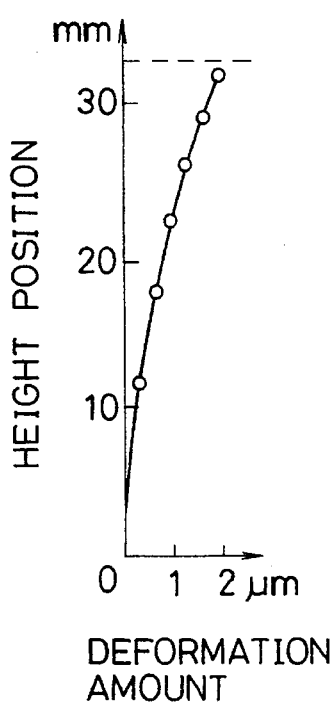
FIG. 5(c) is a graph showing an analysis of deformation between time 2 and time 3.
Figure 6:
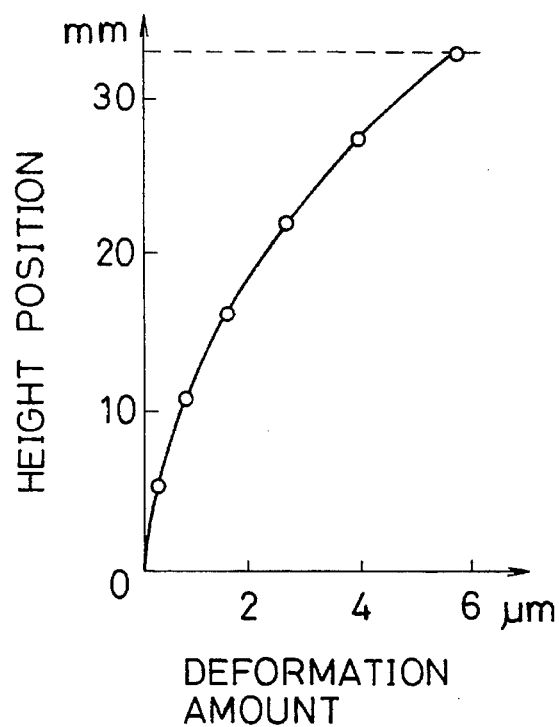
FIG. 6 is a graph showing the distribution of deformation $S_{0,3}$ obtained by summing the analytical results of FIGS. 5(a), 5(b) and 5(c).
Figure 7:
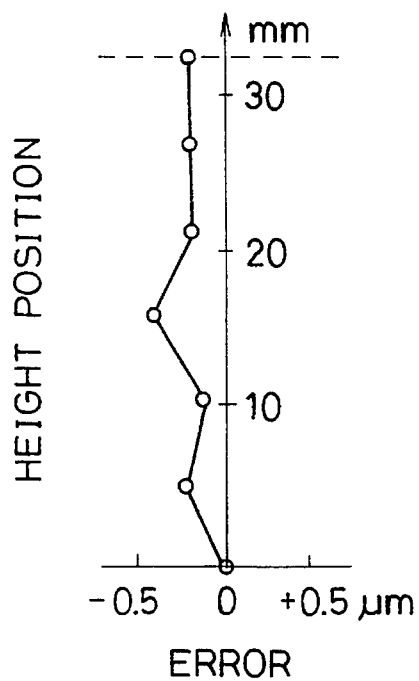
FIG. 7 is a graph showing the difference obtained by subtracting the analytical results of FIG. 3(a) from the analytical results of FIG. 6.

The analytical results for deformations $S_{0,1}$, $S_{1,2}$ and $S_{2,3}$ are shown in FIGS. 5(a), 5(b) and 5(c). FIG. 6 shows the composite deformation amount obtained from these analytical results. Since the composite deformation amount of FIG. 6 should coincide with the deformation amount of $S_{0,3}$ of FIG. 3(a), the error e between the two deformation amounts calculated as e=($S_{0,1}$+$S_{1,2}$+$S_{2,3}$)− $S_{0,3}$ becomes as shown in FIG. 7. The largest error is 0.4 µm. Defining the offset as −0.2 µm, this amounts to an error of ±0.2 µm. The small magnitude of the error, which is thought to occur during reading of the interference fringes, demonstrates that by summing the speckle interference fringe patterns it is possible to measure large deformations with high accuracy.

On the basis of the foregoing results, the following method was developed for determining large deformation using ESPI.

First, a series of speckle pattern images starting from that before the deformation ($S_0$), continuing through those in the course of the deformation ($S_1$, $S_2$, $S_3$ . . . , $S_{n-1}$) and ending with that after completion of the deformation ($S_n$) are stored in a frame memory. This completes the measurement. The analysis processing is then started. The difference $S_{0,1}$ between the first speckle pattern image $S_0$ and the first speckle pattern image after the start of deformation $S_1$ is found. If the number of interference fringes is small, the difference $S_{0,2}$ with respect to the second speckle pattern image is found. In this way, the differences with respect to progressively later speckle pattern images are determined until the speckle interference fringe image $S_{0,i}$ enabling determination of the largest possible deformation is found. In a similar manner, the differences $S_{i,i+1}$, $S_{i,i+2}$, . . . , are found until the speckle interference fringe image $S_{i,j}$ enabling determination of the largest possible deformation is found. This process is repeated to find differences $S_{j,k}$, . . . , $S_{l,m}$ and the final difference $S_{m,n}$. The symbols i, j, k, l, m, n represent positive integers satisfying the relationship i<j<k<l<m<n. By adding together $S_{0,i}$ to $S_{m,n}$ it is possible to measure the distribution $S_{0,n}$ of any deformation no matter how large.

Figure 8A:
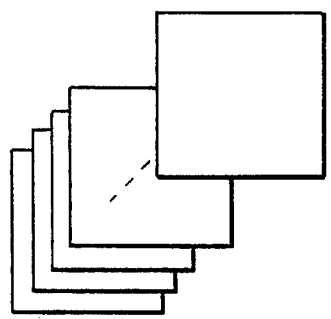
Figure 8B:
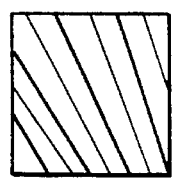
Figure 8C:
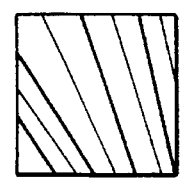
Figure 8D:
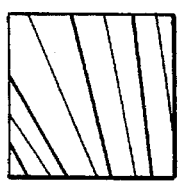
Figure 8E:
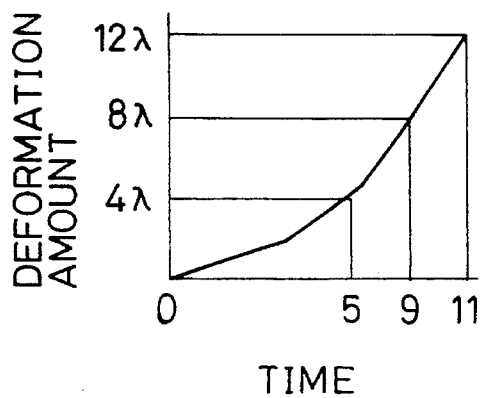
Figure 9:
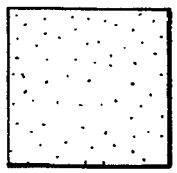
FIG. 9 shows an image representing the deformation between time 0 and time 12 obtained by taking the difference between the first and twelfth images of FIG. 8(a).

Thus the method of deformation measurement using electronic speckle pattern interferometry according to this invention extends the range of deformation measurement by storing speckle pattern images one after another and then at a later time successively finding the differences between appropriately selected pairs of the stored speckle pattern images. When an attempt is made to use the prior art method of deformation measurement using electronic speckle interferometry for measuring large deformation, the density of the interference fringes may become so high as to make them unreadable. In real-time holographic interferometry, holograms have to be remade many times in the course of the deformation. Therefore, the measurement is not only discontinuous but highly troublesome to conduct. In contrast, in the present invention, which uses electronic speckle pattern interferometry, since the speckle interference fringes first appear as a result of taking the difference between speckle images before and after deformation, only speckle pattern images of the continuously deforming object to be measured are recorded in real time (at the frame rate of the TV camera). For example, 12 images $S_0$–$S_{11}$ are recorded, as shown in FIG. 8(a). Then, as shown in FIGS. 8(b), 8(c), 8(d), for determining the deformation between images $S_0$ and image $S_{11}$, the images are divided into groups $S_5$–$S_0$, $S_9$–$S_5$ and $S_{11}$–$S_9$, the difference between the first and last member of each group is taken, and the differences in deformation are summed. The result is shown as an image in FIG. 8(e). In the image of FIG. 8(e), the object to be measured shows the greatest deformation at the point at the upper right and an analysis can be conducted on the basis of the manner in which the deformation occurred. For comparison, FIG. 9 shows the deformation image obtained when the difference between images $S_0$ and $S_{11}$ is obtained without dividing the images into groups. It will be noted that the image of FIG. 9 contains no interference fringes and consists solely of speckle noise (the dots in the image), making measurement of the deformation impossible. This is because the large deformation produced so many interference fringes that they cannot be individually distinguished.

What is claimed is:

1. A method for measuring large deformation of an object using speckle interferometry, comprising the steps of:

(1) storing in an image memory a series of speckle images formed by superposing a laser beam reflected from the object and a laser beam reflected from a separate surface at specified intervals within a time from immediately before the start of deformation to the termination of deformation;

(2) reading a first speckle image stored immediately before the start of deformation and a second speckle image stored at a first specified interval to obtain a difference between the first and second speckle image, thereby inducing a speckle interference fringe representing deformation of the object during the first specified interval;

(3) reading the second speckle image and a third speckle image stored at a second specified interval to obtain a difference between the second and third speckle images, thereby inducing a speckle interference fringe representing deformation of the object during the second specified interval;

(4) continue reading subsequent pairs of said series of speckle images until induction of a speckle interference fringe representing deformation of the object during a final specified interval;

(5) obtaining amounts of deformation of said object at the respective specified intervals from the speckle interference fringes thus obtained; and (6) summing said amounts of deformation.

* * * * *